United States Patent [19]
Anderson

[11] 3,800,117
[45] Mar. 26, 1974

[54] EDM APPARATUS FOR FINISHING ROLLS
[75] Inventor: Alex Lennart Anderson, Rockford, Ill.
[73] Assignee: The Ingersoll Milling Machine Company, Rockford, Ill.
[22] Filed: Sept. 15, 1971
[21] Appl. No.: 180,551

Related U.S. Application Data
[63] Continuation-in-part of Ser. No. 781,388, Dec. 5, 1968, abandoned.

[52] U.S. Cl. .............. 219/69 V, 51/49, 219/69 E, 51/289 R
[51] Int. Cl. .................... B23k 9/16, B24b 5/00
[58] Field of Search .................... 51/48–51, 3, 51/53, 103–108, 181, 289 R; 219/68, 69 D, 69 E, 69 M, 69 V, 70

[56] References Cited
UNITED STATES PATENTS

| | | | |
|---|---|---|---|
| 461,828 | 1891 | Fry | 51/49 |
| 1,511,842 | 10/1924 | Schmidt | 51/289 R X |
| 2,974,215 | 3/1961 | Inoue | 219/68 |
| 3,240,914 | 3/1966 | Hill et al. | 219/69 M |

FOREIGN PATENTS OR APPLICATIONS

| | | | |
|---|---|---|---|
| 856,340 | 12/1960 | Great Britain | 219/69 E |
| 1,076,094 | 7/1967 | Great Britain | 219/69 E |

Primary Examiner—J. V. Truhe
Assistant Examiner—Hugh D. Jaeger
Attorney, Agent, or Firm—Wolfe, Hubbard, Leydig, Voit & Osann, Ltd.

[57] ABSTRACT

Rolling mill rolls, such as the final rolls for a sheet cold rolling operation, are machined by electrical discharges in a lathe-type machine with a roll length electrode tool. High areas of the roll shape the adjacent surface of the electrode tool, either by a mechanical or electrical wear-in operation, so that such surface substantially complements the desired final roll contour. The shaped electrode tool is subsequently used for electrical discharge machining (EDM) the roll to the level of the lowest roll portions so as to impart a very uniform matte texture to the roll surface and provide a roll with substantially perfect cross-sectional circularily. If the machining is carried out with a segmented electrode tool, the tool is preferably moved slightly from time-to-time axially of the roll during at least the final stages of the machining process. Following the machining, the roll may be used without further processing as an improved substitute for rolls textured by the conventional shot blasting technique or it may be ground to a bright polish.

10 Claims, 14 Drawing Figures

INVENTOR
Alex Lennart Anderson
By Wolfe, Hubbard, Voit & Osann
ATTORNEY

Fig. 4 PRIOR ART
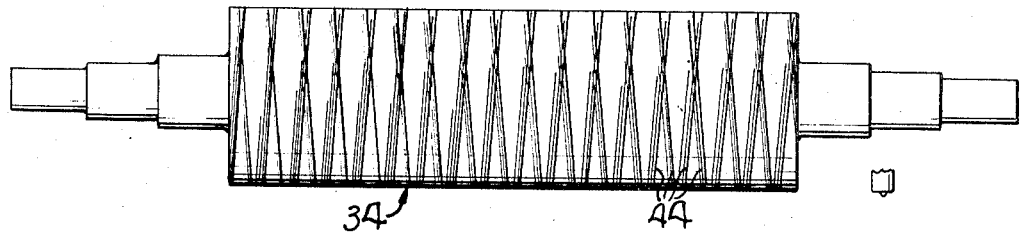
Fig. 5 PRIOR ART
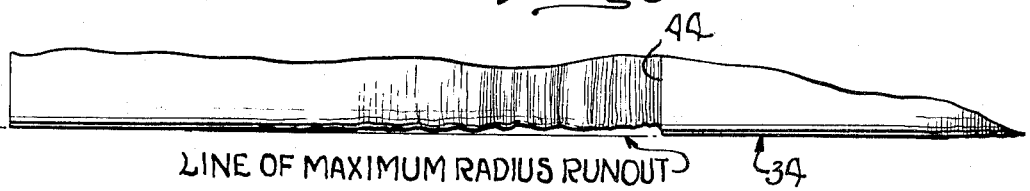
LINE OF MAXIMUM RADIUS RUNOUT
Fig. 6
Fig. 7

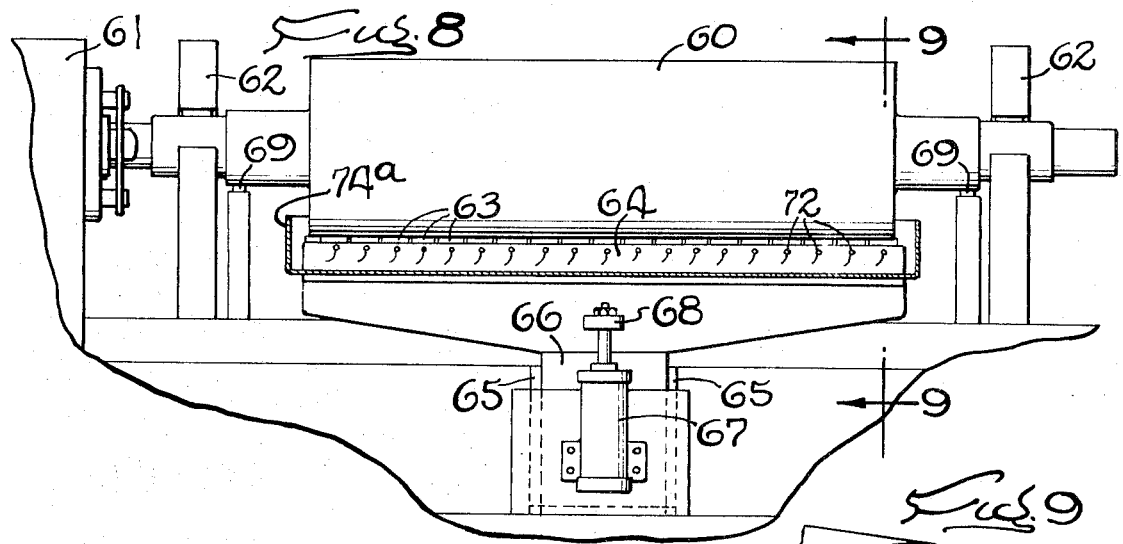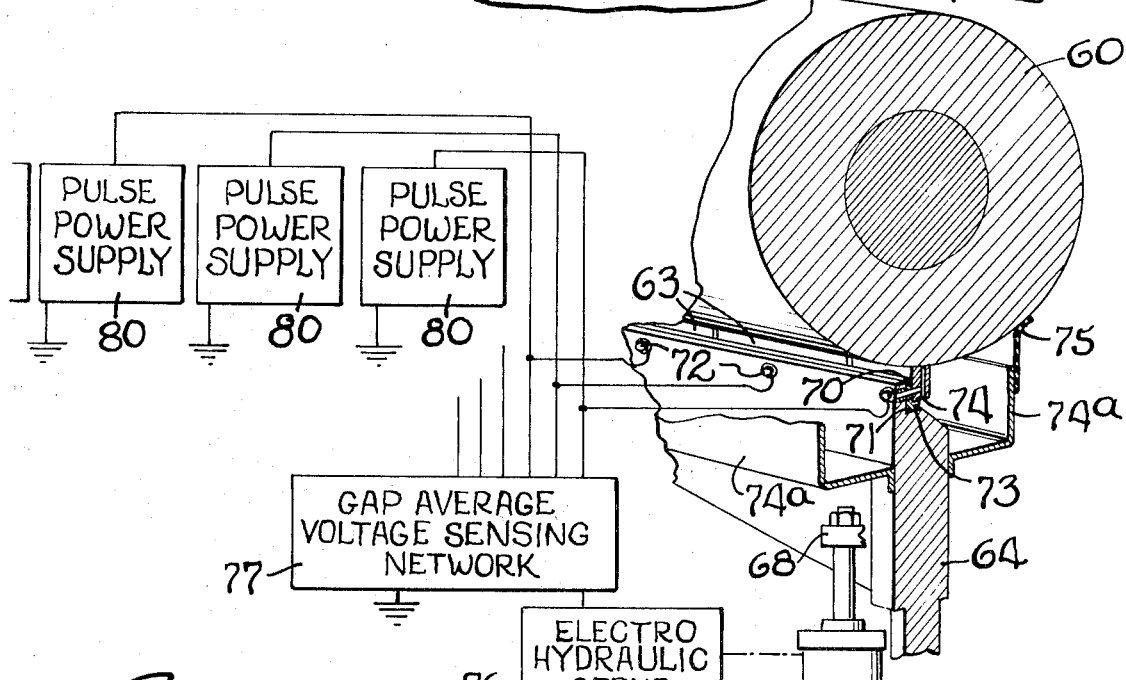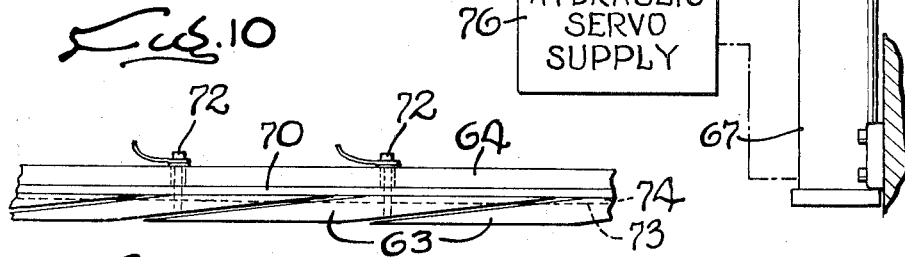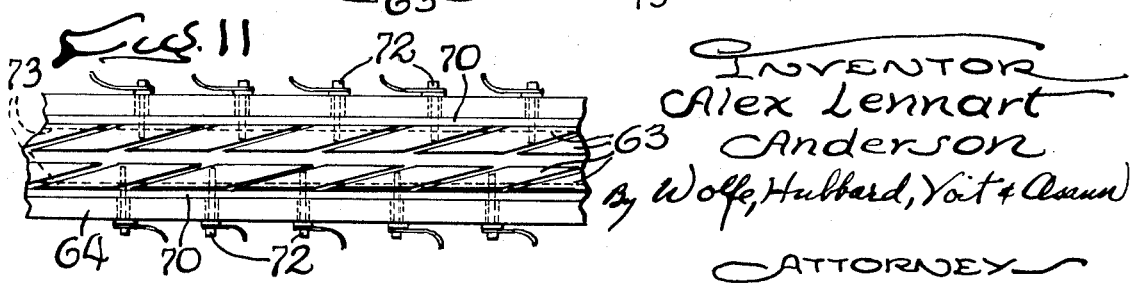

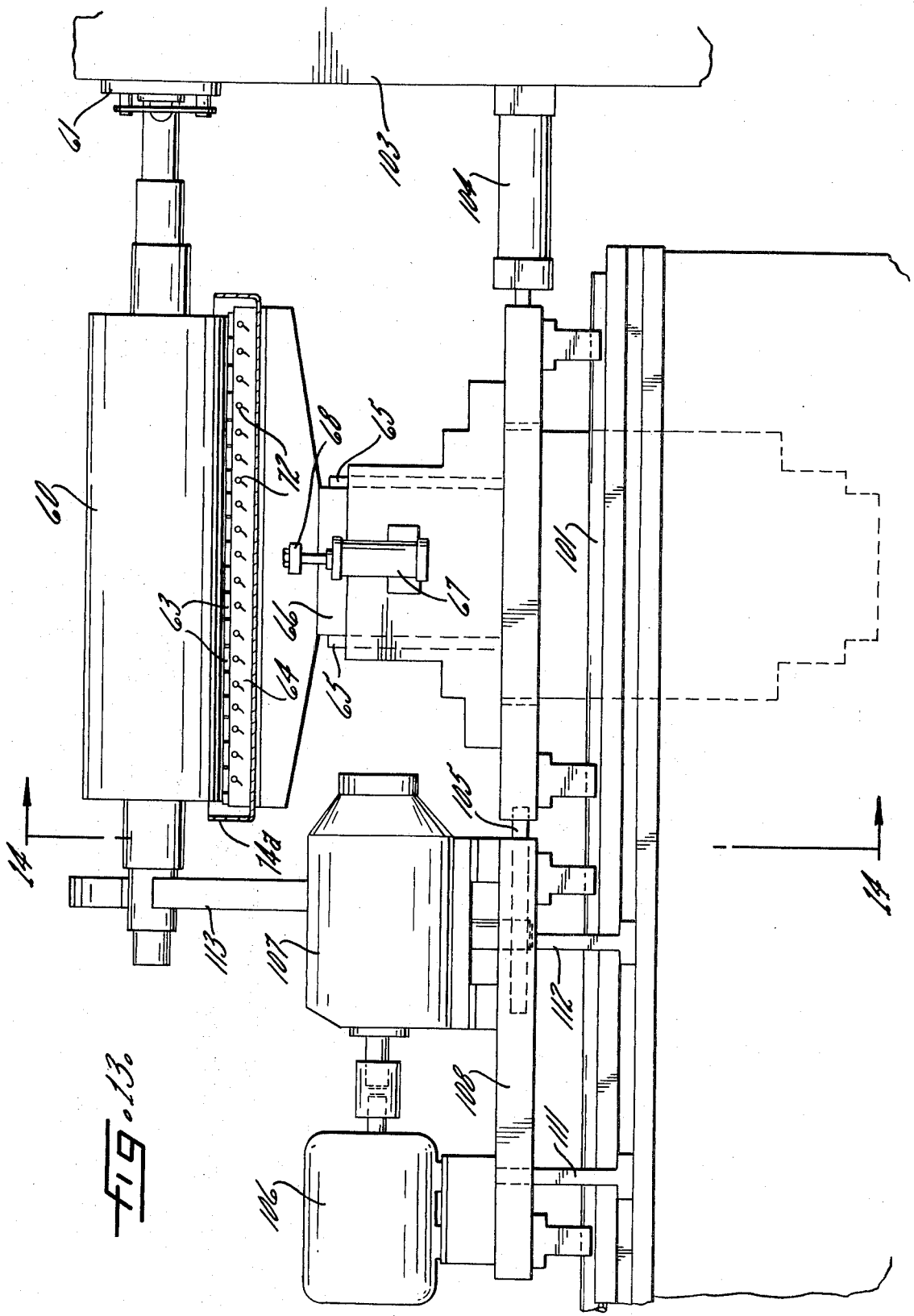

EDM APPARATUS FOR FINISHING ROLLS

This application is a continuation-in-part of my application Ser. No. 781,388 filed Dec. 5, 1968 now abandoned, for "EDM Method and Apparatus for Finishing Rolls."

This invention relates to the finishing of rolls such as are employed for rolling sheet metal and particularly to the finishing of hardened steel rolls used in rolling mills for final cold rolling of sheet steel.

The primary object of this invention is to improve the surface appearance of rolled sheet material by removing defects from the surface of the rolls employed in the rolling process.

Steel and aluminum sheet are examples of sheet materials requiring careful attention to their surface. The sheet surface may desirably bear a bright smooth appearance, in which event at least the last roll in the mill is itself finished to a bright polish. Alternatively, the sheet surface may desirably have a matte or pitted finish, in which event at least the last roll in the mill is provided with a complementary matte surface. In both cases, a particular problem has been the elimination of appearance defects due to large area undulations caused by extremely small and gradual variations in the thickness of the sheet. Such variations are not readily detected by measuring devices in any small area of the sheet, but they may be visually noticeable under certain lighting conditions in larger sheet expanses because of their adverse effect on the planarity of the sheet surface. Such variations may also be the cause of burnishing or other surface appearance changes of the thicker portions of the sheet when it is pressed into a die cavity in making auto body parts or other products.

The problem of preventing departures from planarity in rolled sheets surfaces is not a new one and has been under attack for many years. For example, it is known that the roll drive must be smooth and the roll bearings must be carefully aligned to avoid vibrations and pounding of the sheet as it is rolled. Rolling pressures are also calculated, and if there would be any tendency for the roll to defect under the rolling pressure selected, one or more crowns (roll segments of gradually increasing diameters) may be machined into the roll to offset the deflection and thus eliminate it as a cause of any non-planarity. The best practices are followed in machining the roll to precise dimension, such as by finishing grinding the formed roll after hardening with a lathe-type traveling head or traveling table precision grinder in an attempt to remove dimensional variations.

The small undulating defects I am concerned with are those remaining even after the other practices designed to remove them or their effect have been followed. I have found that these small, but distractingly observable, thickness variations are caused by departures from roll cylindricity or cross-sectional circularity. In one form, such departures are low areas distributed axially and circumferentially of the roll. These departures appear to be an almost inevitable result of the high reaction force between the roll and grinding tool employed during the machining of the roll. In a lathe-type precision grinder, for example, the powered wheel may tend to "dig in" at one edge during its traverse along the roll and thereby leave a helical low area pattern on the roll.

It is therefore another primary object of my invention to provide a method and apparatus for finishing rolls to perfect cross-sectional circularity, by which I mean the elimination of axially and circumferentially distributed low radius roll areas sufficient to generate detectable defects in sheet produced by the roll.

Because of the high reaction forces involved in the conventionally employed grinding process, any yield whatever in the grinder may cause the small degree of wheel misalignment that leads to the production of the undesired low radius areas on the roll. Varying degrees of hardness of the roll cause the reaction forces to change during the grinding operation and, therefore, compound the problem by leading to a non-uniform metal removal rate. Reduction of the reaction forces by reducing the depth of the cut or the carriage speed is an obvious expedient for reducing the errors, but a substantial increase in machining time is required to achieve even a small improvement.

Thus, a further object of this invention is to provide an economical method and means for employing electrical discharge machining to accurately finish machine rolls.

In electrical discharge machining, reaction forces between the workpiece and electrode tool are negligible, even when the electrode and electrical conditions are selected to achieve a maximum machining rate. EDM has not heretofore been economical for machining large cylindrical workpieces, such as steel rolls, since much faster machining has been attainable with other processes, such as grinding. I have found that this disparity may be substantially reduced, at least to the extent that the many advantages of EDM roll finishing make it an acceptable alternative. Instead of having the electrode tool traverse the roll as in grinding, I employ an elongated electrode tool which spans the length of the roll and which preferably comprises several segments in order to permit the simultaneous machining of several different roll areas. The edge of the electrode tool adjacent the roll is shaped to complement the desired roll contour. Such shaping would appear to present problems akin to those presented in machining a roll, but I have found that very precise shaping may be readily accomplished, either by an electrical or mechanical wearin process, using the imperfectly contoured roll as the shaping tool.

Hence, it is still a further object of this invention to provide an electrical discharge machining process for finishing rolls wherein the electrode tool is first shaped by the roll and then employed to machine the roll to a desired contour.

The use of a segmented electrode tool materially reduces the time required to machine a roll, but tends to produce a roll surface with circumferential stripe-like defects in substantial alignment with the corners of the electrode segments. Such defects do not prevent the finished roll from having perfect cross-sectional circularity, but they do comprise deviations from the desired roll contour and may cause the rolled sheet to have observable appearance defects in the nature of lines running along its length. This problem may, however, be overcome by moving or oscillating the electrode tool axially of the roll during at least the final few minutes of the machining process. The amount of movement should be limited, particularly if a crowned roll contour is sought, since such movement may tend to introduce errors into the electrode contour and cause excessive electrical erosion of the electrode tool requiring that it be frequently replaced. I have found that a useful limit is to confine the movement of the electrode tool to a distance about equal to the distance along a line parallel to the roll axis between the corresponding ends of two adjacent electrode segments. This limit permits sufficient movement of the electrode tool to eliminate any observable circumferential striping of the roll and yet prevents any material change in the contour or wear rate of the electrode tool.

It is therefore yet another object of this invention to provide an electrical discharge machining method and means for finishing rolls in which adverse effects of electrode wear are avoided as the machining proceeds.

Rolls have heretofore been finished with a matte texture to impart such a texture to rolled sheets. Such a sheet texture may be useful prior to the final rolling stage, say, to enable stacked sheets to be more readily separated after annealing. Further, as a final surface finish, a matte texture is preferable to a smooth finish if the paint retaining capabilities of the sheet are of concern. The conventional technique for matte texturing rolls is to use a shot blasting process. The shot or grit is selected for size and shape and then propelled or "blasted" against the roll in an attempt to produce a uniformly pitted and unpeened surface. This objective has not, however, been fully realized. The matte surface provided by shot blasting is not uniform. Moreover, even if the roll has a high quality surface finish, the full advantages thereof are often lost because of the aforementioned departures of the roll from perfect cross-sectional circularity. For example, variations in the thickness of the rolled sheet may cause the matte surface of the thicker sheet areas to be selectively peened or destroyed when pressed into a die cavity. On the other hand, electrical discharge machining of the roll not only provides the perfect roll cross-sectional circularity necessary to avoid variations in the thickness of the rolled sheet, but also imparts a very uniform matte surface to the roll. The discharge energy content may be adjusted to provide matte surface textures ranging from the very fine to the very course, but once the energy level adjustment is made, the size of the particles dislodged from the roll by successive discharges does not materially change.

Consequently, another object of this invention is to provide a roll finishing process and apparatus for imparting an improved matte texture to rolls and sheet rolled thereby.

In some instances, smoothly finished sheet is required and the matte texture imparted to the rolls by the electrical discharge machining must then be eliminated. Such a sheet finish is desirable, for example, to enable the sheet to be more positively gripped if it is to be further processed by later smooth rolls. Thus, a further object is to provide combined grinding and roll finishing apparatus for machining rolls to perfect cross-sectional circularity, with either a matte textured or polished surface.

Other advantages and objects of my invention will become apparent when the following detailed description of a preferred embodiment and modifications thereof is read in connection with the accompanying drawings, in which:

FIG. 4 is a side elevation of a roll finished by the grinding machine of FIG. 2 to show by shading the opposed helix low area pattern resulting from the edge grinding effect.

FIG. 5 is a greatly enlarged fragmentary view of a profile of a portion of the surface of the roll of FIG. 4 relative to a maximum radius reference line.

FIG. 6 is a plan view of a single-position combined EDM and finish grinding machine for perfect circle roll finishing.

FIG. 7 is a plan view of a two-position combined EDM and finish grinding machine for perfect circle roll finishing.

FIG. 8 is a view, partially in section, of an apparatus for discharge machining the surface of a roll to perfect circularity.

FIG. 9 is a semi-schematic perspective view of the electric and hydraulic circuitry associated with the FIG. 8 apparatus.

FIG. 10 is a plan view of a portion of the single-row electrode array of the FIG. 8 apparatus.

FIG. 11 is a plan view of a modified form of the FIG. 10 apparatus illustrating the use of a two-row electrode array.

FIG. 13 is a view generally corresponding to FIG. 8, but showing a modification made to oscillate the electrode tool so as to prevent observable roll defects of the type shown in FIG. 12.

While the invention is described in detail with reference to certain illustrated embodiments, it is to be understood that my intent is not to limit it to those embodiments. To the contrary, I intend to cover all modifications, alternatives, and equivalents falling within the spirit and scope of the invention as defined by the appended claims.

Figure 1:
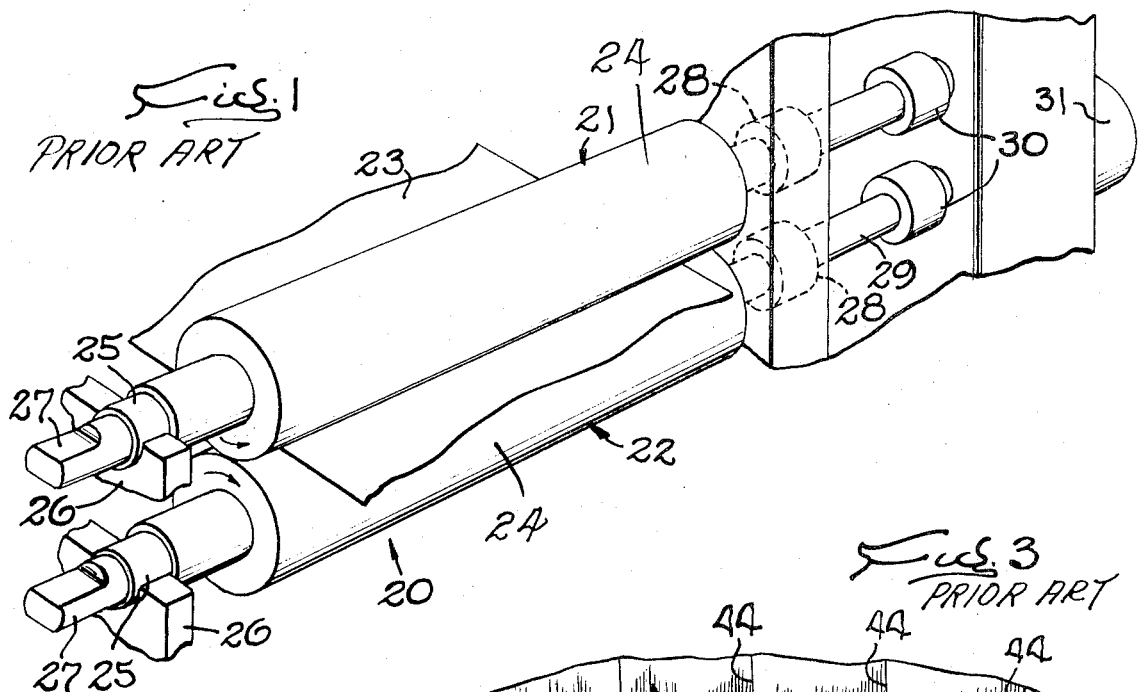
FIG. 1 is a perspective view, partially cut away, of a two-high, single-stand temper mill in which a pair of rolls, such as may be machined by the invention, are shown in the process of cold reducing a steel sheet.

Referring now to FIG. 1, an exemplary two-high single-stand temper mill 20, such as may be employed for the last step in a cold reduction process in making sheet steel, is illustrated. The pair of rolls 21 and 22 are power driven to cold reduce the steel sheet 23 as the sheet is rolled between them. The dimensions are those conventionally associated with rolling wide sheets, the diameter of the working surface of each of the illustrated rolls being approximately 2 feet and the axial length of each working surface or body being approximately 8 feet. The roll is suitably crowned, as is not uncommon in a temper mill, the roll diameter gradually increasing from the ends toward the center of the working surface in this particular instance to provide a single crown with a center diameter 0.003 inches greater than the end diameters. The crown profile is designed to offset the deflection of the roll axis under the rolling reaction forces so that the roll surface along the path of contact with the sheet remains exactly parallel to the roll axis while the sheet is rolled. The number of crowns and the amount of any such crowning designed into the roll depends upon roll size, pressures and other factors. The problem to which my invention is addressed is the same for rolls with different types and degrees of crowning or with no crowning at all. Since the desired profile of the roll is very close to a straight line and is intended to be straight when rolling, I have herein referred to a desired straight line profile of the roll without intent of suggesting that the invention is limited to uncrowned or flat rolls.

While perfect cross-sectional circularity (sometimes referred to herein simply as "circularity" or "perfect circle finish") is theoretically desirable for any roll in the mill, the small departures from circularity caused by conventional roll finishing processes are too minute to be of concern in any but the last one or two stages of a cold rolling mill. Very planar sheet steel may be obtained using perfect circle rolls in a final cold reduction stages to reduce the thickness or gauge of the sheet by approximately 1 – 1½ percent. At the present state of the art, the formation of scale during hot rolling and the necessity of scale removal when appearance is a cominant consideration limit the advantages to be gained by employing perfect circle finishing for the rolls used in such a process.

Apart from any perfect circle finishing of the rolls 21 and 22 in accordance with this invention, the rolls and the stand shown in FIG. 1 are of conventional design. Thus only the working surfaces 24 of the rolls need have perfect circularity because the other surfaces do not work the metal. Indeed, the last two inches or so at the outer ends of the working surfaces also need not necessarily have perfect circularity since the roll length generally exceeds the sheet or coil width by at least several inches. The necks 25 at the outer ends of the working surfaces are usually one-step or two-step reduced cross-section diameter portions journalled in babbit bearings or chocks 26. The wobblers 27 at ends of the rolls have flats or cut-away portions for positive couplings. One end of each roll is usually connected through a coupling box 28 to a spindle 29 and then through another coupling box 30 to the shaft of the mill drive motor 31.

Figure 2:
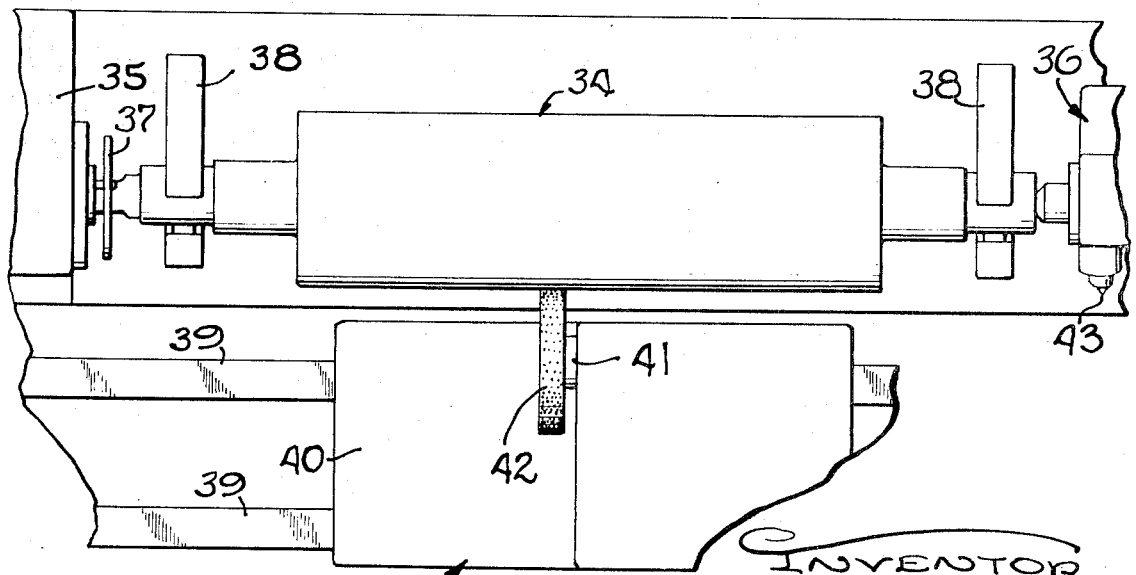
FIG. 2 is a plan view of a lathe-type traveling head roll grinding machine conventionally employed for precision grinding of hardened steel rolls for installations such as the stand of FIG. 1.

For an appreciation of the appearance defect problem and the validity of my solution to it, reference is next made to a conventional machine as shown in FIG. 2 for finishing or refinishing the hardened steel working rolls. This is a traveling head precision grinder 33 having a lathe-type bed with a roll 34 axially positioned by centers of the headstock 35 and the tailstock 36. The headstock has a powered spindle to rotate the roll, a drive collar 37 being suitably employed to engage the roll wobbler at the headstock end. Also shown are bearing supports 38 for supporting the roll for rotation at the neck bearing surfaces designed for the chocks. These supports are suitably of an adjustable three-point bearing type. When grinding on centers with the centers designed to support the roll as well as carry the end thrust, the supports 38 need not be employed. A pair of guide ways 39 on the machine base alongside the roll support the traveling carriage 40. A motor driven spindle 41 on the carriage carries a rotary grinding wheel 42. The carriage also has cross slides (not shown) for feeding the grinding wheel toward the roll. In operation, the roll is rotated in one direction by the machine headstock, the grinding wheel is rotated to provide a differential velocity (usually by rotation in the other direction), and the carriage carries the wheel past the dressing point and down the length of the roll and back with a given feed setting. Typically the wheel is fed toward the roll for successively lighter cuts and at slower carriage speeds in succeeding passes.

Since the sheet appearance depends primarily on the roll surfaces, each roll must also be refinished from time to time due to spalling, marring or otherwise uneven wear of its surface during use. In addition, in installations where the roll has a matte surface for imprinting a matte surface in the rolled product, the relatively rapid wear of the matte surface may make it necessary to more frequently schedule the roll for matte finish renewal.

Even though the FIG. 2 grinder is carefully constructed to prevent the obvious sources of grinding inaccuracies, such as eccentric mounting of the roll or insufficient rotational support for the roll, minor finishing inaccuracies may persist. These show up in the circumferential run-out (the difference between the maximum and minimum radii of the roll). Thus, a dial gauge having a sensing stylus pressed against the roll will indicate variations in radius as the roll is turned through one revolution. In various hardened steel rolls finished by precision grinding machines, I have found a measurable run-out at each circumference tested at distributed points along the length of the roll. While the maximum run-out on rolls ground by modern equipment is usually very small, say, about 0.0001 – 0.0002 of an inch as compared to the roll diameter of, say, two feet, it is in fact large enough to create wave-like appearance defects in the rolled sheet. Furthermore, run-outs up to 0.0005 of an inch are not uncommon in rolls ground on older machines. While eccentric mounting of the roll will also contribute to run-out, the run-out here referred to is that remaining after eccentricity has been eliminated — viz., the run-out attributable to high and low radius areas located at different angular positions in spaced circumferences along the length of the roll. The defect pattern detected is one in which the low areas (the areas of radii less than the design radius) are distributed axially and circumferentially of the roll. Thus, around the circumference of the roll taken at any point along its length, and along the length of the roll from any point on its circumference, there are low radius areas deviating from the maximum or design radius for the roll.

Figure 3:
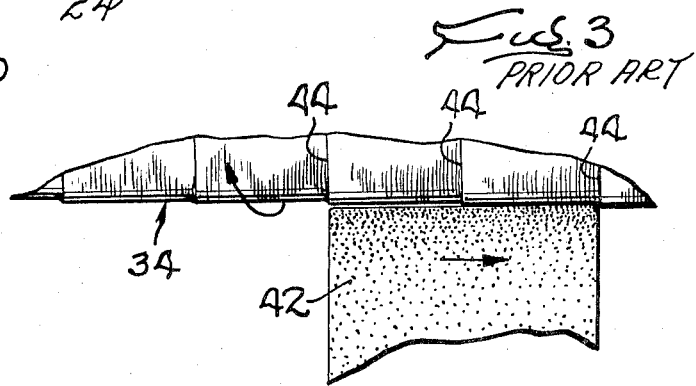
FIG. 3 is an enlarged fragmentary view of the grinding wheel-roll surface interface in the machine of FIG. 2 illustrating in exaggerated degree the tendency of a wheel edge to dig into the roll surface as the wheel carriage travels along the roll.

This characteristic circumferentially and axially spaced defect pattern appears to be caused by uneven or non-uniform attack of the roll surface by the grinding wheel. As shown in FIG. 3, the high reaction forces between the roll surface and the traveling wheel 42 causes the wheel to tilt slightly so that its leading edges cuts a continuous low area path 44 into the roll. The degree of tilt and the sharpness of the wheel edge have been exaggerated to facilitate illustration and it is, therefore to be understood that the usual low area path profile can be expected to have a more gradually curved departure from the design contour. Various combinations of looseness of the grinding wheel spindle in its bearings and other factors causing play or yield in the grinding system defeat a uniform cut by the entire flat peripheral surface of the wheel. The low radius path generated in the roll around and along its length during a single pass of the wheel is a continuous helix. A reverse helix low area path is traced in the return pass of the grinding carriage. This opposing helix or criss-cross low area pattern leaves diamond-shaped high areas on the roll surface. These high areas are further divided and subdivided by the succeeding passes of the wheel, but they are seldom completely removed.

The crossed helix low area pattern shown in FIG. 4 represents the defect pattern caused by the first forward and return pass and is consistent with the run-out measurement pattern and other observations. The angle or pitch of the successive helical patterns on any given roll usually decreases, since the traverse speed of the grinding wheel is generally reduced for succeeding finer finish passes. Thus, the different helical paths generated during the grinding of a roll with the dimensions of the rolls shown, for example, in FIG. 1 are more or less randomly spaced from each other with the result that the complete cross-helix pattern is likely to be obscured. Usually the most noticeable parts of the pattern are the apexes or circumferentially aligned V-shaped high areas occurring where helical paths in reverse directions cross each other. These apexes typically repeat at intervals of 2 inches or less along the length of the roll at any circumferential point. The cross-helix pattern may be complicated somewhat by the previous history of the roll because path variations in surface hardness and chatter marks or other machining irregularities that may be present when finish grinding is begun usually affect any inherent tendency of the wheel to dig in or yield.

A characteristic of the roll defect pattern which I have discovered to be useful in removing the defect in the rolls is illustrated in part by FIG. 5 which shows in exaggerated detail the profile of the roll surface in a low area as contrasted with the line of maximum radius run-out, which is the locus of maximum radius points at each circumference taken at each point along the length of the roll axis. If the roll is designed as a straight cylinder, the maximum run-out line is a straight line. If a crowned profile is called for, the line of maximum run-out has the corresponding crown contour. In any event, the maximum radius is not less than the design radius at any circumference along the length of the roll, despite the crossed-helix grooves.

Thus, the low areas can be simultaneously detected and displayed by removing the high or maximum radius areas by successive amounts as the roll turns on its axis. I have found that this is most readily done by electrical discharge machining in which discharges from a tool electrode conforming to the complement of the desired roll profile, whether it be crowned or straight, selectively machine the nearest portions of the roll as the roll rotates. In such a process, often called spark machining and which itself is old in the art, over-voltage initiated discharges are repeatedly initiated across a narrow, dielectric liquid-filled gap defined between the workpiece electrode and the electrode tool. Upon each application of a voltage impulse (assuming the gap spacing is within the usual operative limits) the discharge will generally occur in the specific region where the gap is narrowest. Particles are removed from both the workpiece and the tool by each discharge even though there is no measurable reaction force between them, and the machining conditions are therefore selected to provide a suitably high ratio of workpiece removal to tool removal. The removal of a very small workpiece particle by each discharge to form a microscopic pit in the workpiece increases the gap in that region by the removal amount, and leaves the next most narrow portion of the gap as the most likely site of the next discharge. Thus, by using a electrode tool shaped to complement the desired roll contour for machining a roll in accordance with this invention, the high areas of the rotating roll are differentially removed without any measurable reaction force between the tool and roll electrodes.

Since a surface machined by spark or discharge machining is characteristically pitted and readily distinguished from a cut or abraded surface, the contrast between the machined and non-machined portions of the roll makes visual inspection simple and more informative than run-out measurements. Of course, as the discharge machining proceeds, the machined or former high areas become larger in proportion to the remaining untouched or non-machined areas. When the entire roll surface can be seen to have been discharged machined, the roll is completely machined to perfect circularity — i.e., the dimension departures sufficient to produce appearance defects in the sheet produced by the roll have been removed. By inspection of the roll surface before completion, however, the extent and cause of defects may be identified so that remedial measures can be taken. For example, dominant helical low areas of one pitch rather than another may indicate the desirability of changing the grinding program. Chatter marks caused by an out-of-balance grinding wheel may also be readily identified.

As a final finishing process, electrical discharge machining of a roll not only provides perfect roll circularity, but also imparts a very uniform and easily controlled matte texture to the roll surface. Once a layer of surface metal has been removed by electrical discharge machining, the roll surface texture, does not therefore change as additional metal is removed by further machining. Unlike a shot blasted surface, the EDM surface texture is nearly uniform in terms of both size and distribution of pits. Thus, the paint retaining qualities of such surface as transferred to the sheet are uniformly good and the appearance of the surface after painting is uniformly pleasing. Since the dimensions of the individual pits are on the order of micro-inches, the matte texture of the roll does not adversely affect the planar appearance of the rolled sheet. Various specifications for texture coarseness in the rolled product are met by controlling the energy content of the discharges to establish the desired pit size, lower current and shorter discharges resulting in smaller pits for finer textures.

Electrical discharge machining of the roll is also useful as an intermediate step when the roll is to be later ground to a polished finish. The removal of the departures from circularity by the discharge machining step permits finish grinding to a high polish starting with a very light cut and slow traverse speed so as to materially reduce the tendency for the grinding wheel to skew and produce pronounced low area patterns. Discharge machining to remove the undulating contour produced by prior rough grinding also eliminates any possibility that such contour may be perpetuated during the subsequent final cuts and, therefore, may be employed as an improved substitute for several of the customarily employed intermediate grinding steps. In some instances, rather than a rough grinding-discharge machining-fine grinding sequence, the discharge machining step may be followed by a loose abrasive polishing step sufficient to smooth the discharge-machined matte surface to the desired degree of polish. As previously mentioned, at the present state of the art, substantial material removed by discharge machining is usually undesirably slow. However, it should be appreciated that after rough grinding of a roll, there is only a relatively small volume of material that need be removed from the high areas to achieve the desired cross-sectional circularity. Of course, time permitting, the grinding EDM process may be employed without prior grinding of the roll. Indeed, the preliminary grinding step is preferably avoided whenever possible in the interest of increasing the useful life of the roll by minimizing the amount of metal removal during the finishing or refinishing processes. For example, prior grinding can sometimes be advantageously bypassed in the refinishing of rolls with surfaces free of deep gouges or other marks.

FIG. 6 illustrates one form of combining precision grinding and EDM machining in which a roll 45 is mounted for rotation between the headstock and tailstock centers 46 and 47 on a machine bed with a rotary grinding wheel carriage 48 slidable on ways 49 along one side of the bed. An electric discharge machine electrode and dielectric liquid trough assembly 50 is positioned under the roll, and the roll and electrode are connected (by means not shown) to an EDM power supply suitably mounted in a console 51 on the other side of the machine bed. Alternate grinding and discharge machining of the roll are facilitated without the necessity of removing the roll from the machine. Thus, this embodiment is particularly convenient where discharge machining is an intermediate step in the surfacing of the roll between rough and find grinding steps.

FIG. 7 illustrates another form of combined precision grinding and EDM machine which accommodates two rolls 52 in axial alignment. The rolls are supported end-to-end by separate headstocks 53 and adjustably positioned tailstocks 54. In this machine, a single grinding carriage 55 slides on ways 56 extending parallel to the axis of both rolls so that the same grinder may machine either roll. An electric discharge machining power supply 57 is connected to either of two similar electrode tool and trough assemblies 58 which are positioned under the respective rolls. In normal use, one roll is ground while the other is discharge machined, and each roll remains between the same centers for both operations. This type of machining may be employed for either the two step grinding-discharge machining process or the three step grinding-discharge machining-grinding process. The grinding operation may proceed on one roll while discharge machining proceeds on the other. Each of the separate roll drives 53 should have a very low speed available to facilitate inspection of the machining progress without stopping the roll.

In accordance with another aspect of the invention, the electrode tool is shaped to complement the exact desired contour of the roll by a simple wearing-in or setting process in which the shaping is done by the very roll that is to be subsequently machined. The imperfectly contoured roll is a highly accurate tool for shaping the machining surface of the electrode because, as previously explained in connection with FIG. 5, the locus of maximum roll radius, which is generated during roll rotation, conforms to the design roll contour, whether it be straight or crowned. Thus, as the roll rotates, the proper configuration for the electrode surface opposite any given circumference of the roll is precisely defined by the maximum radius of the roll at the given circumference. Both mechanical and electrical discharge processes for wearing-in the electrode can be advantageously employed. In each process, the electrode whether it be one segment or an end-to-end array of shorter segments, is held in a holder aligned parallel to the roll axis and fed towards the roll axis while the roll is rotated. The process continues until the entire length of the machining surface of the electrode tool (the surface adjacent the roll) has been worn in. Obviously, the closer the electrode conforms before starting, the faster it can be worn-in or seated. An electrode can be easily and inexpensively shaped to within a few hundreds or thousands of an inch to the roll design contour by conventional methods, but the problem solved in accordance with this aspect of the invention is the precise machining and aligning of a long electrode or electrode array.

In the mechanical wear-in process, which has thus far been found useful only for graphite electrodes (the conventional one of the non-metallic EDM electrode tool materials) the electrode array is held in an axially aligned position and fed radially to contact the rotating roll so that the electrode is abraded by rubbing. The graphite is sufficiently soft and friable compared with the usual metallic roll materials not to score the roll and to be easily worn despite the relatively smooth surface of the roll. The holder for the electrodes and the feed system during wear-in are advantageously those of the electric discharge system so that the electrodes are abraded or worn in while in place for discharge machining the same roll. After the electrode is worn in, the holder is simply backed off to define the machining gap to be maintained, any loose particles are removed, and the discharge power supply is turned on. If rolls of the same design contour are to be successively discharge machined, the same electrode may be left in the holder and reused with little or no further wear-in necessary.

In the electrical wear-in process, the discharge machining operation effective for machining the high areas of removed roll is simply a continuation of the discharge machining initially effective for removing the high areas of the tool electrode. This process is preferred generally over mechanical wear-in and is especially desirable for shaping electrode tools comprised of copper or other metals commonly employed in fabricating electrodes for electrical discharge machining. The relative removal rates of material from the roll and the electrode tool, together with the respective amounts of material rmoved therefrom during wear-in, largely determine the limits of accuracy. At the beginning of the operation, the discharges occur between the high points (maximum radius areas) on the roll and the high points (areas extending beyond the desired complementary contour) of the tool electrode. The electrode is made relatively narrow in arcuate span so that its subtended angle is very small compared to the composite angular extent of the high areas in the roll at any circumference. Thus, even if each discharge removes equal amounts of material from the electrode and the tool, the maximum radius run-out of the roll is not significantly altered during the electrode wear-in process because the high areas of the electrode are eroded long before the high areas of the roll. As a result, the electrode is contoured to closely complement the maximum radius run-out of the rotating roll or, in other words, the desired final roll contour. For example, with an electrode having an edge thickness of less than one-half inch and with a roll having a diameter of two feet, the ratio of roll circumferential path to electrode circumferential path is more than 150:1. While not all of the roll surface at any given circumference is at the design radius due to the circumferentially distributed low areas, the roll area is an order or orders of magnitude greater than the corresponding electrode tool area. Discharges to the roll low areas seldom, if ever, occur in view of the preferential discharge to the axially and circumferentially distributed high areas adjacent the electrode at any instant, and hence the roll low areas are not deepened in the course of wearing in the electrode tool. After the electrode tool has been conformed to the maximum run-out or reference contour of the roll, the discharge machining process is continued to selectively remove the high areas of the roll. The electrode tool is itself eroded, but once having been worn in, the toll surface wears uniformly to retain the desired contour as the roll is machined.

As is conventional practice in discharge machining, the tool electrode is positioned relative to the roll to maintain a gap spacing of a few thousandths of an inch as the machining proceeds. Automatic (i.e., servo control) of the tool feed is preferable in order to avoid short circuits or current flow through gap debris. The impulse voltage is selected to be high enough so that a discharge is assured somewhere across the gap. The exact location of the discharge, however, is inherently selective to occur with a high degree of probability at the then-existing narrowest part of the gap.

For some electric discharge machining conditions the polarity of the electrode relative to the workpiece has a large effect on the workpiece-to-electrode wear ratio and the workpiece finish. Certain combinations of electrode and roll materials may yield a higher wear ratio and/r a better roll surface finish if the machining is carried out with the roll negative relative to the electrode (i.e., the so-called reverse polarity condition). Others may yield superior results if the machining is carried out with the roll positive relative to the electrode (i.e., the so-called normal or straight polarity condition). Thus, it is to be understood, that the relative polarities of the electrode tool and roll may be selected for optimum performance. When appropriate for a particular combination of electrode and workpiece materials, one polarity may be used for the electrode wear-in process to obtain a relatively low roll-to-electrode wear ratio and the opposite polarity may be used for the subsequent roll finishing to obtain a relatively high wear ratio. In that event, the polarity reversal or switchover point is most conveniently determined by simply inspecting the roll as the process continues since precise timing is not critical. When the cumulative axial width of the circumferential patches or stripes of textured areas on the roll approximates the axial width of the electrode (or, if segmented, the axial width of the segments), the electrode can be assumed to have been worn in or fitted.

Segmenting of the electrode tool is preferred for faster machining. The total tool electrode length must very nearly be equal to the axial length of the working surface of the roll, but the discharge machining of a roll with a long, say, 8 foot working surface is very slow if limited by the rate at which discharge pulses can be supplied at the present state of the art using a single electrode 8 feet long. If, however, the electrode tool is segmented along its length, with each segment electrically insulated from the others and connected to an effectively independent power supply, the machining rate can be multiplied many times because several discharges may simultaneously occur. The electrode segments must, of course, be rigidly held with respect to each other to comprise an electrode array which is movable as a unit toward and away from the roll. The segments are preferably of equal length so that no one segment is responsible for the machining of significantly greater portions of the roll than any other segment. The number of segments that may advantageously be employed depends primarily on the number of effectively independent power supplies available and on the number of segments that can be mechanically accommodated in an array having a length generally equal to the axial length of the particular roll that is to be machined. I have not noted any adverse effects on either the overall contour of the electrode array or the cross-sectional circularity of the machined roll even when the discharge machining has been carried out with effective segment lengths as short as about 0.8 of an inch.

Additional details of a suitable mechanical arrangement of the roll and tool electrodes for discharge machining are illustrated by FIG. 8 where a roll 60 is shown positioned horizontally for rotation between centers. For rotating the roll over a range of speeds, including very low speeds to permit inspection of the defect pattern displayed from time to time as the machining proceeds, a motor drive 61 engages one end of the roll. I have found peripheral speeds in the range of 150–300 feet per minute (about 25–50 r.p.m. with the two-foot diameter rolls of FIG. 1) to be satisfactory for discharge machining and lower speeds of, say, 2–5 r.p.m. to be satisfactory for inspection purposes. As shown, three point bearing supports 62 support the weight of the roll at the roll necks, but the rolling mill chocks may themselves be employed as there is little possibility that the particles removed by discharge machining can reach and contaminate the bearings. The tool electrode segments 63 are fixed in a rigid array to a support beam 64 which, in turn, is positioned under the roll and aligned parallel with the roll axis. In this embodiment, movement of the electrode array and support beam in other than the vertical direction is constrained by fixed vertical slideways 65 anchored to the machine bed or foundation. A tongue or slide 66 depending from the beam engages the ways 65 so that tilting of the beam 64 is also prevented.

A hydraulic cylinder 67 is suitably employed to set the vertical position of the beam 64. The vertical extent of the slideways and cylinder length are largely dependent on the different roll diameters to be accommodated by the equipment because very little vertical travel is required after the electrode to roll gap spacing has been initially approximated. The cylinder body is suitably secured to the ways 65 and the piston to a bracket 68 on the beam 64 for controlled lifting and lowering of the beam and electrode tool under hydraulic fluid flow. Any conventional hydraulic system may be employed, and mechanical or electrical lift systems may be substituted as desired.

To maintain good electrical contact with the roll, brushes 69 bear against a portion of the roll neck at each end of the roll for connection to the common or ground terminal of the power supply or supplies. As a safety measure, the entire roll support and drive is preferably at ground potential, but the use of the brushes makes it unnecessary to rely on the usually higher resistance and inductance path through the drive or support bearing system. As will be seen, the electrode segments are electrically insulated from each other. To that end, each segment 63 is held in place against an insulating strip 70 which lines the inner face of a shoulder 71 provided by the beam 64. This is suitably accomplished by means of insulated screws 72 which are threaded into the segments and tightened to draw the segments against the insulating strip 70. The heads of the screws 72 are, of course, convenient terminals for electrical connections between the segments 63 and a power supply. Further, the segments 63 are spaced apart so that there are narrow gaps between them (sufficient insulation is provided by a gap even as small as 0.005 of an inch) and underlying each segment there is an insulator spacer 73 which has a shoulder 74 to support the lower edge of the segment and thereby prevent it from skewing out of line. The spacers 73 are preferably shorter than the segments 63 and positioned so that they do not bridge the gaps between adjacent segments so as to simplify the flushing of any debris (particles removed from the electrode or workpiece) which may sift into those gaps during the machining.

The machining rate depends in large part on the thickness of the electrode because material may be removed from any given high area of the roll only when that area is closer to the electrode than any other roll area. At the same time, however, the electrode must not be so thick as to prevent flushing of debris from the work gap because otherwise the debris might tend to bridge the gap between the electrode with undesirable consequences, such as "recutting" (scoring) or burning of the roll. Preferably, the electrode thickness is uniform along the length of the roll in order to machine all circumferences of the roll at substantially the same rate. Thus, to maintain a uniform effective electrode thickness with a segmented array, the ends of the electrode segments 63 have complementary bevels and the bevel angles are selected (taking the inter-segment gaps into account) so that the rearward corners of each but one of the end segments align in the direction of roll rotation with the forward corners of one of the adjacent segments. In the illustrated embodiment, the bevel angles are selected so that the rearward corners of each segment align with the forward corners of the next segment to the right and it is, therefore, the right-hand end segment which does not overlie any other segment. The result is that the effective electrode thickness at any point along the array is a composite comprised of a part of one segment and a part of another segment. I have found that satisfactory discharge machining is achieved with an electrode thickness of about three-sixteenths to three-eighths of an inch.

It is especially desirable to minimize the possibility of what is known as a gap short circuit condition (insufficient spacing between the electrode tool and the roll most commonly caused by the effective spacing be reduced by a build-up of debris) lest machining irregularities be introduced by too frequent backing off of the electrode tool to clear the condition. In the illustrated embodiment, the debris is flushed from the machining gap by the circulation of the dielectric liquid caused by the pumping action afforded by the rotating roll. To retain the liquid, a trough 74a is provided around the array of electrode segments 63. For convenience, the trough side and end walls are secured to the electrode support beam 64. The trough walls should be high enough to permit the liquid level to rise above the bottom of the roll being machined and thereby assure constant inundation of the gap. Squeegee blades 75 may be fastened along the top of the trough sidewalls to remove the surplus liquid and debris from the roll surface as it leaves or enters the trough and to keep foreign matter out. Various expedients well known in the art may also be employed to aid in preventing any build-up of debris in the gap, such as filtering and recirculating the dielectric or directing jets of clean liquid to the surface of the roll entering the gap. It will, of course, be appreciated that the electrodes may be placed in positions other than directly under the roll if means are provided to supply and retain liquid in the gap. It will also be understood that when a segmented electrode array is used, the inter-segment gaps should at least roughly offer the same resistance to flow of the dielectric liquid as the machining gap so that all gaps are adequately flushed.

As further shown in FIG. 9 for the illustrated segmented electrode tool, each segment 63 is connected to one terminal of a separate pulse power supply 80, the other terminal of each power supply being grounded and connected to the brushes 69. Simultaneous voltage pulses of the desired polarity can thus be periodically applied across the gap between the roll and each segment. The required separation or isolation of the power supplies is a matter of degree. Separate power supplies are effectively provided using a single, low internal resistance, power source if there is sufficient isolating resistance in the separate electrode switching or coupling circuits to prevent a discharge at one electrode from dropping the source voltage below the level necessary to initiate another discharge at another electrode. The actuation of the hydraulic cylinder 67 is preferably under an automatic electro-hydraulic servo control 76 responsive to the average gap voltage through a sensing network 77. As is conventional where multiple power supplies are used with a common servo, the average voltage measured is that for the segment at which the average gap voltage (and therefore the spacing) is least. The design of the electrical power supply and servo system are not themselves part of my invention, and various suitable electric discharge machining systems may be employed. One multiple electrode power supply system is shown, for example, in pending application Ser. No. 727,199 of Robert B. Bertolasi, filed May 7, 1968.

Since the thickness of the stock to be removed is very small, the servo system is primarily useful during the electrode wear-in and initial machining stages. If desired hand regulated feed may be employed, but the machining speed is usually reduced in doing so because of the likelihood of short circuiting or conduction through gap debris.

Multiple rows of electrodes in the same electrode holder may be used as illustrated by the double rows 78 and 79 of segmented electrodes as shown in FIG. 11. This makes it possible to increase the obtainable machining speed by increasing the number of separate power supplies in use without further reducing the axial length of the individual electrode segments.

The method and apparatus for roll finishing hereinabove described have been found to be very effective for finishing rolls to perfect cross-sectional circularity while imparting a superior matte texture to the surface of such rolls. Thus, without more, the present invention is an improvement over the conventional roll finishing processes. I have, however, noted that at least some of the rolls finished in accordance with this invention through the use of a segmented electrode array have faint stripes which extend circumferentially of the roll in general alignment with the corners of the segments. This pattern of circumferential stripes is shown by shading in FIG. 12 to sharply contrast with the other roll areas, but such showing is exaggerated in the interest of clarity, it being understood that the pattern is usually so faint that it can only occassionally be seen even upon careful inspection of the roll surface. The nature and cause of the striping are not completely understood. The stripes apparently represent a very slight irregularity in the roll contour, and it is believed that they may be low radius areas caused by the segment corners being preferential arc terminii. At any rate, the pattern is undesireable because it is imprinted on the rolled product in the form of lengthwise extending lines which may be visually detectable under some lighting conditions.

The striping pattern may be prevented or eliminated (i.e., at least reduced so that its presence cannot be detected upon inspection of the roll or rolled product) without sacrificing the increased machining efficiency afforded by the segmented electrode array. This may be accomplished by using a segmented electrode array for discharge machining the roll to perfect cross-sectional circularity and by then using a continuous roll length electrode tool to further machine the roll until the striping pattern has been removed. The changeover from the segmented to the continuous electrode tool may be affected by removing the segmented tool and installing the continuous tool in its place or, if each has a separate holder, simply by de-energizing the segmented tool and energizing the continuous tool. The timing of the changeover, is not critical, but a useful guide is to make the changeover when the perfect circle finishing of the roll has been completed as indicated by the uniform appearance of its working surface. The amount of time to be devoted to the machining with the continuous electrode is not so easily defined because it depends on a number of variables, including the machining conditions, the roll and electrode composition and the severity of the roll striping pattern. Visual inspection of the roll surface is not completely reliable since the pattern to be eliminated is very faint and may be obscecured by the characteristically pitted condition of the roll surface. Thus, the amount of time to be allotted for the continuous electrode machining should be conservatively estimated on the basis of experience gained through, say, a cut and try technique.

I, however, prefer to avoid the increased complexity and additional machining time inherent in the use of a continuous electrode for final machining of the roll. I have found that the roll striping pattern may also be eliminated by moving the segmented electrode array in a direction parallel to the roll axis from time-to-time during at least the final few minutes of the machining operation. There is a tendency for the contour of the machining edge of the electrode array to be altered whenever the array is shifted axially of the roll, but the movement necessary to eliminate the striping pattern is so slight that there is no material alteration of the electrode edge contour, even if the roll is crowned. Specifically, the distance traversed by the array to eliminate the striping pattern need be no greater than the distance axially of the roll between the forward corner at one end (say, the right-hand end) of one segment and the rearward corner at the corresponding end (the right-hand end) of the adjacent segment. If the electrode array has a uniform effective thickness, the above-identified distance is simply the axial length of one segment.

Figure 12:
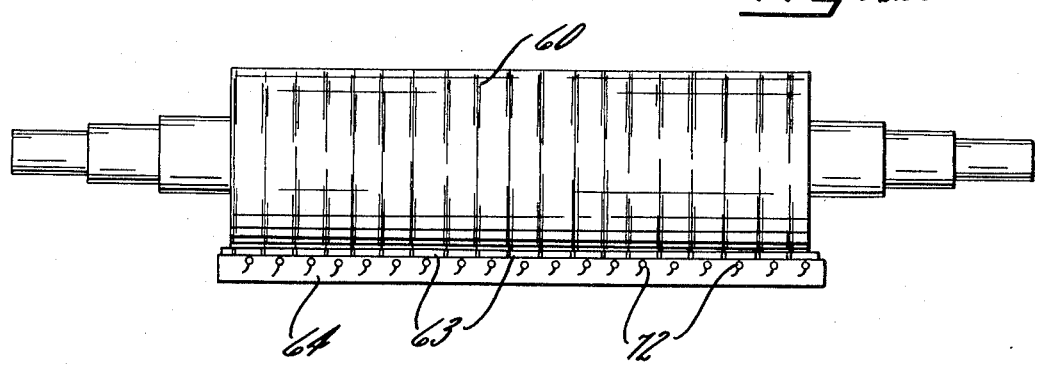
FIG. 12 is a side elevation of a roll finished by electrical discharge machining with the apparatus of FIG. 8 to show by shading the circumferential stripe-like defect pattern which may appear when a stationary segmented electrode tool is employed.

The apparatus of FIG. 8 may be readily modified as illustrated in FIGS. 12 and 13 to permit axial movement of the electrode array. Little more than means mounting the support beam 64 and the array fixed thereto for movement axially of the roll, such as the parallel, axially extending horizontal ways 101 and 102 shown, are required because the desired motion of the array may be provided manually, say, through the operation of a turnbuckle (not shown) connected between the support beam and a fixed point, such as a steady rest 103. It is, however, more convenient and less demanding on the operator if there is also a suitable drive mechanism for moving the array automatically in accordance with a predetermined program. Thus, in the illustrated embodiment, there is a hydraulic cylinder 104 which has its piston secured to the support beam 64 and its body secured to the steady rest 103. The cylinder 104 is pressurized to bias the support beam 64 into engagement with an eccentric cam 105 which, in turn, is rotated by power supplied by a motor 106 through an appropriate speed reduction coupling 107. Thus, the support beam and electrode array therefore oscillate axially of the roll through a distance dependent on the difference between the maximum and minimum radii of the eccentric and at a rate dependent on the rotational speed of the eccentric. I prefer to limit the distance traversed by the array to roughly the length of one segment. This is a generally satisfactory limit when the segment is no more than a couple of inches or so. For arrays with longer segments, a more restrictive limit may be necessary to insure that the portion of the roll working surface that may reasonably be anticipated to engage the sheet during the rolling operation (all but the last 2–3 inches at either end) is uniformly machined and to prevent the electrode edge contour from being materially altered. Hence, as an alternative limit for arrays comprised of long segments, it is worth noting that the pattern of circumferential stripes has not been detected on rolls discharge machined using an electrode array having segments 8 inches long by three-eighths of an inch thick beveled at a 45° angle, when the array has been re-positioned every 3–5 minutes within a limited axial span of three-eighths of an inch. I have found that the axial movement of the array need not be continuous and that the striping pattern is eliminated even if the average rate of movement is as slow as about 0.015 of an inch per minute.

Figure 14:
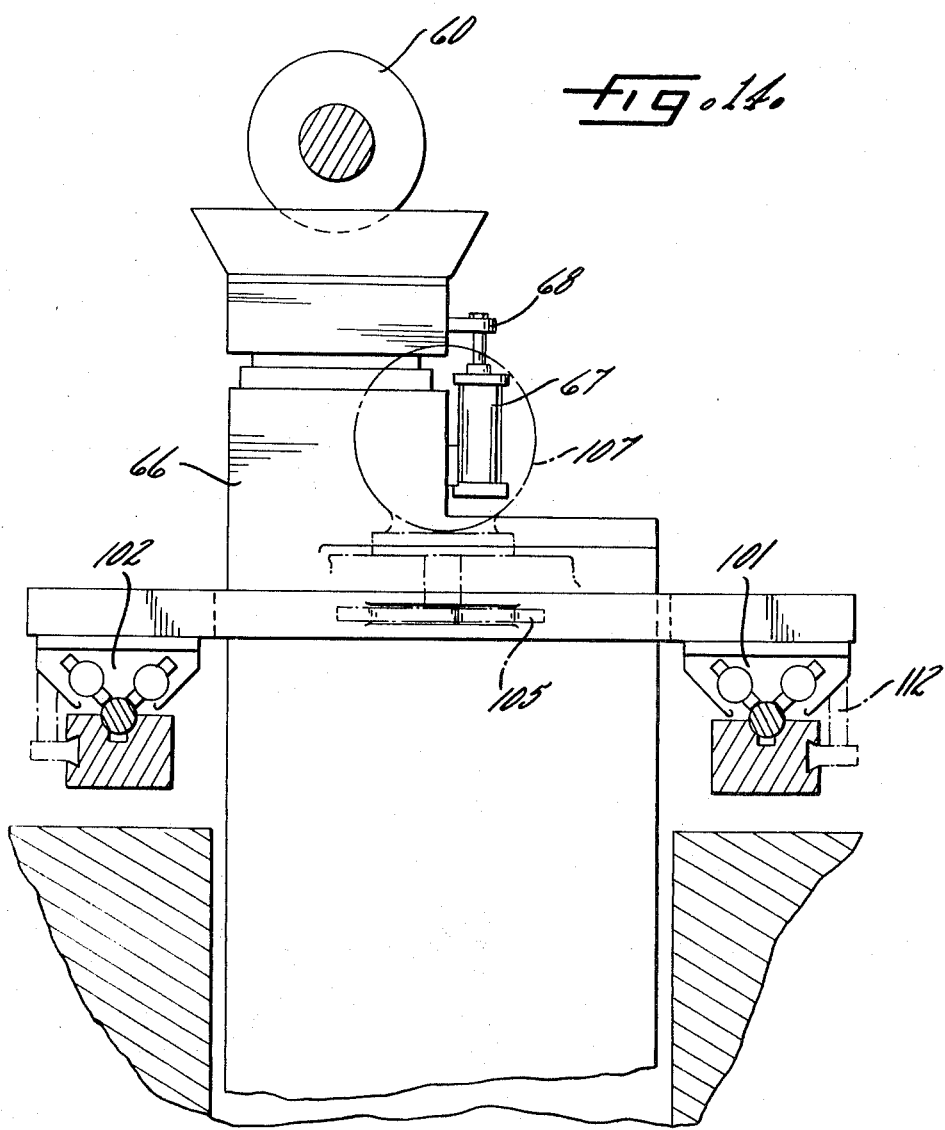
FIG. 14 is a section, partly in phantom, of the modified apparatus, the section being taken along the line 14—14 shown in FIG. 13.

Turning to the more detailed aspects of the embodiment illustrated by FIGS. 13 and 14, it will be seen that the motor 106 and speed reduction coupling 107 for the eccentric 105 are mounted on a carriage 108 which is releasably anchored in position on the ways 101 and 102 by manually operated clamps 111 and 112. The bearing support 113 for the end of the roll opposite the steady rest 103 is also mounted (by means not shown) to be re-positioned axially of the roll. Thus, the equipment has the flexibility necessary to accommodate a variety of different roll lengths. For set-up purposes, the positions of the bearing support 113 and the support beam 64 are adjusted for the given roll length. The carriage 108 is then advanced until the eccentric 105 engages the support beam 64. The clamps 111 and 112 are tightened and pressure is then applied to the clinder 104 to bias the support beam against the eccentric. An electrode array and trough sized to the given roll length are installed and the roll is set in place. The set-up is then complete and the discharge machining may proceed.

In summary, it will now be understood that my invention provides an improved method and means for finishing rolls such as are used in rolling sheet steel. The finished rolls are characterized by perfect cross-sectional circularity and a very uniform matte surface texture, even if the hardness of the roll surface varies from point-to-point. The matte texture may, if desired, be removed by polishing the roll surface. It will also be appreciated that the improved roll characteristics result from EDM finishing of the roll using a roll-length electrode tool, which may be contoured by the imperfectly contoured roll to complement the desired roll contour. Finally, it will be understood that the electrode tool may be segmented for relative fast machining of the roll and that the segmented tool may be oscillated or otherwise moved from time-to-time axially of the roll through a limited distance to optimize the contour of the finished roll.

I claim as my invention:

1. Apparatus for finishing an elongated working surface of a roll subject to axially and circumferentially distributed low radius defect areas to an ultimately desired design roll contour of substantially perfect cross-section circularity including means for rotating the roll about its longitudinal axis;
a narrow electrode tool having a length substantially equal that of the roll working surface and a contoured longitudinal edge substantially complementing a desired contour for the roll working surface;
means for positioning said electrode tool parallel to the roll axis with said edge adjacent but slightly spaced from the roll working surface;
means coupled to the roll and electrode tool for supplying a series of over-voltage initiated discharges therebetween to remove particles from the working surface area of the roll successively least distant from the electrode surface as the roll rotates; and
means coupled to said electrode tool for moving said tool toward the axis of said roll to maintain a substantially constant gap between the electrode edge and the roll working surface as particles are removed from the working surface of the roll.

2. The apparatus of claim 1 wherein said electrode tool is divided into a plurality of segments electrically insulated from each other, and said means for supplying discharges includes means for supplying discharges between each of said segments and said roll.

3. The apparatus of claim 2 wherein said segments are of equal length and have end portions beveled at complementary angles selected to provide a uniform effective width for said electrode tool along its entire length.

4. The apparatus of claim 2 further including means coupled to said electrode tool for oscillating the electrode tool in a direction parallel to the roll axis with the total traverse of the electrode tool being limited so as not to exceed the length of a single segment.

5. The apparatus of claim 2 wherein said working surface has a length selected to provide at each end of the roll a relatively short increment which may be imperfectly finished, and further including means mounting said electrode tool for movement longitudinally of said roll over a limited distance shorter than each of said increments.

6. Apparatus for finishing an elongated working surface of a roll subject to axially and circumferentially distributed low radius defect areas to an ultimately desired design roll contour of substantially perfect cross-sectional circularity comprising means for rotating the roll on its longitudinal axis;
a narrow elongated electrode tool divided lengthwise to provide a plurality of electrically insulated segments and having a longitudinal edge of substantially uniform width in the direction of roll rotation at all points along the electrode tool, said edge being shaped to complement a predetermined ultimately desired contour for said roll working surface;
means for holding said electrode tool with said edge parallel to the roll axis but slightly spaced from the roll to define a gap therebetween;
means for retaining a dielectric liquid between the electrode edge and the roll working surface to flood said gap;
electrically isolated means coupled between said roll and said electrode tool for supplying a series of over-voltage initiated discharges between each of said segments and said roll for removing particles from points on said roll successively least distant from the electrode edge as the roll rotates; and
servo control means coupled to said electrode tool and responsive to a signal representative of the most closely spaced electrode and roll areas for moving said electrode tool to maintain a predetermined minimum gap spacing as particles are removed from the roll.

7. The apparatus of claim 6 wherein said electrode tool is also divided width-wise to provide a plurality of rows of electrically insulated segments.

8. A combined grinding and discharge machining apparatus for finishing an elongated working surface of a roll subject to axially and circumferentially distributed low radius defect areas to an ultimately desired design roll contour of substantially perfect cross-section circularity comprising a machine bed with means for supporting a roll horizontally for rotation;
means for rotating the roll about its longitudinal axis at a controlled speed;
a carriage on the bed slidable along the length of the roll axis at one side of the roll;

a grinding wheel on the carriage with its periphery adjustable for grinding contact with the roll surface to finish said roll to approximate cross-sectional circularity while leaving a generally helical pattern of axially and radially distributed high radius defect areas;

a narrow, elongated electrode tool having a contoured longitudinal edge complementing a desired contour for said roll working surface;

means for positioning the electrode tool adjacent the bottom of the roll surface with its longitudinal axis parallel to the longitudinal axis of said roll and with a maintained small gap spacing between said electrode tool and said roll; and means for applying a series of over-voltage initiated particle-removing discharges between the electrode tool and the roll to further finish said roll by removing particles from the working surface areas of the roll successively least distant from the electrode surface as the roll rotates.

9. The apparatus of claim 8 further including a trough stationed under the roll position and positioned around the electrode tool for carrying dielectric liquid at a level sufficient to flood the gap between the tool and roll.

10. Apparatus for finishing an leongated elongated surface of a roll subject to axially and circumferentially distributed low radius defect areas to an ultimately desired design roll contour of substantially perfect cross-section circularity including means for rotating the roll about its longitudinal axis;

a narrow electrode tool having a length substantially equal that of the roll working surface and a contoured longitudinal edge substantially complementing a desired contour for the roll working surface, said electrode tool being divided into a plurality of segments electrically insulated from each other and having their end portions complementarily beveled at angles selected to cause each segment to be aligned in the direction of roll rotation in overlapping relationship with an adjacent segment so that the effective edge width of the electrode tool at any point along its length is comprised of parts of two adjacent segments;

means for positioning said electrode tool parallel to the roll axis with said edge adjacent but slightly spaced from the roll working surface;

means coupled to the roll and electrode tool for supplying a series of over-voltage initiated discharges therebetween to remove particles from the working surface area of the roll successively least distant from the electrode surface as the roll rotates, said means for supplying discharges including means for supplying discharges between each of said segments and said roll;

means coupled to said electrode tool for moving said tool toward the axis of said roll to maintain a substantially constant gap between the electrode edge and the roll working surface as particles are removed from the working surface of the roll; and means for retaining a dielectric liquid between the electrode edge and the roll working surface to flood said gap.

* * * * *